United States Patent
Hamlin et al.

(10) Patent No.: US 6,615,312 B1
(45) Date of Patent: Sep. 2, 2003

(54) METHOD FOR PROCESSING FILE SYSTEM SERVICE REQUESTS IN A COMPUTER HAVING AN ATTACHED DISK DRIVE THAT CAN REPRODUCE STREAM DATA AND NON-STREAM DATA

(75) Inventors: Christopher L. Hamlin, Los Gatos, CA (US); Michael K. Eneboe, San Jose, CA (US); Andrew D. Hospodor, Los Gatos, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 0 days.

(21) Appl. No.: 09/515,275

(22) Filed: Feb. 29, 2000

(51) Int. Cl.$^7$ ............................................. G06F 12/00
(52) U.S. Cl. ........................ 711/112; 711/156; 711/161
(58) Field of Search ................................ 711/112, 156, 711/161

(56) References Cited

U.S. PATENT DOCUMENTS

| | | | | |
|---|---|---|---|---|
| 5,870,757 A | * | 2/1999 | Fuller | 707/201 |
| 5,940,868 A | * | 8/1999 | Wagner | 711/203 |
| 5,999,622 A | * | 12/1999 | Yasukawa et al. | 380/277 |
| 6,021,414 A | * | 2/2000 | Fuller | 707/200 |
| 6,219,693 B1 | * | 4/2001 | Napolitano et al. | 709/201 |
| 6,314,490 B1 | * | 11/2001 | Morein | 711/129 |
| 6,401,117 B1 | * | 6/2002 | Narad et al. | 709/223 |

OTHER PUBLICATIONS

Bulik, Darrin; Proposal for Audio/Visual Feature Set; T13/D99128 revision 0; Aug. 24, 1999; Western Digital Corp; Irvine, CA.

Noblitt, Marc; Proposal for Streaming AV Commands; T13/D99123 revision 1; Aug. 23, 1999; Seagate Technology; Longmont, CO.

* cited by examiner

Primary Examiner—Reba I. Elmore
(74) Attorney, Agent, or Firm—Milad G. Shara, Esq.; Burns Doane Swecker & Mathis LLP

(57) ABSTRACT

This invention is directed to a method for processing file system service requests in a computer having an attached disk drive that in response to commands from the computer can write data to or read data from disk locations to reproduce stream data and non-stream data. The method comprises the steps of responding to a first file system service request by recording whether the first file system service request is for non-stream data or stream data, associating a first set of disk locations of the disk drive with the first file system service request, and preparing a first command that requires access to the first set of disk locations, the first command including control data categorizing the command as a non-stream access command or as a stream access command in response to the step of recording. The method includes transmitting the first command to the disk drive.

17 Claims, 2 Drawing Sheets

METHOD FOR PROCESSING FILE SYSTEM SERVICE REQUESTS IN A COMPUTER HAVING AN ATTACHED DISK DRIVE THAT CAN REPRODUCE STREAM DATA AND NON-STREAM DATA

BACKGROUND OF THE INVENTION

1. Field of the Invention

The present invention relates generally to processing file system service requests in a computer having an attached disk drive. More particularly, the invention relates to a method for processing such requests in a system where the disk drive, in response to commands from the computer, can write data to and/or read data from disk locations to reproduce stream data and non-stream data.

2. Background Information

A computer having an attached disk drive, such as a magnetic hard disk drive, employs a number of different types of computer programs that cooperate in processes involving accesses to the disk drive. These types include application programs s as word processor or spreadsheet programs, operating systems such as DOS, WINDOWS, UNIX, or Linux and device drivers. A chain of events leading to the writing of data to, or the reading of data from, a disk drive starts with an application program making a function call for a read/write action, and then issuing a file system service request to the operating system.

A typical operating system handles input/output (I/O) requests for stream data using the same procedure associated with I/O requests for non-stream data. Stream data can represent items of a temporal nature such as audio visual (A/V) data or musical data. Stream data can also represent other inherently linear sequential data structures. An inherently linear data structure is one which requires sequential access by its nature; that is, the data structure cannot be reasonably processed or reconstructed if accessed in a non-sequential order. This is in contrast to non-stream data which can be accessed randomly for processing or reconstruction with no inherent access order dependency.

More recently, proposals have been developed to accommodate the handling of I/O requests for stream data differently than the manner by which I/O requests for non-stream data are handled. For example, a document identified as "T13/D99128 revision 0" entitled "Proposal For Audio/Visual Feature Set" available from Western Digital Corporation of Irvine, California and a document identified as "T13D99123 revision 1" entitled "Proposal For Streaming AV Commands" available from Seagate Technology of Longmont, Colo., describe proposals for handling the storage of stream and non-stream data. These proposals describe using multiple modes of operation, whereby a disk drive is placed into one mode or configuration for I/O of stream data, and into another mode or configuration for I/O of non-stream data.

In contrast to conventional I/O commands used to cause data transfers involving read or write actions, set configuration commands cause a change of operating mode to affect the way that later I/O commands are performed until a subsequent reconfiguration command is generated. In the proposals for handling I/O of stream and non-stream data, set configuration commands are used to place a disk drive into a non-stream mode of operation or into a stream mode of operation. Before a read/write operation can be executed, the host operating system causes the drive to operate in the appropriate mode for either a stream operation or a non-stream operation.

Requests associated with reading/writing non-stream data are handled using a drive mode that results in the data being stored on the disk drive in conventional fashion, without observing any specified rate at which the data is written to or read from memory. For example, an application program request to load application software (such as a spreadsheet program) into a disk drive involves writing non-stream, asynchronous data, which has no associated temporal requirements. This write operation can be executed between the host computer and the disk drive without satisfying any specified data rate constraint.

In contrast, application program requests which involve stream data are executed using a drive mode which ensures that associated temporal requirements of the data will be honored when the stream data is written to or read from the disk drive. The I/O requests between the host computer and the disk drive which are associated with a particular data stream occur consecutively, at regular intervals, so that the continuity of the stream can be preserved. The data is stored on the disk using a mode of operation which will ensure that the data rate constraint can be honored during subsequent reading of the data.

The use of different disk drive configurations, or modes, for stream data versus non-stream data, is due to an assumption that disk drives cannot freely mix streaming and non-streaming operations. However, mode switching is inefficient and may require processing in the disk drive which impacts performance.

Accordingly, it would be desirable to develop a method for processing file system service requests which involve non-stream data and stream data, wherein the use of set mode configuration commands can be avoided. In so doing, it would be desirable if the method could be easily integrated with conventional operating systems so that requests for both non-stream and stream data between a host computer and an attached disk drive can be executed without modification to existing file systems.

SUMMARY OF THE INVENTION

This invention is directed to a method and apparatus for processing file system service requests in a computer having an attached disk drive that in response to commands from the computer can write data to or read data from disk locations to reproduce stream data and non-stream data. The method comprises the steps of responding to a first file system service request by recording whether the first file system service request is for non-stream data or stream data, associating a first set of disk locations of the disk drive with the first file system service request, and preparing a first command that requires access to the first set of disk locations, the first command including control data categorizing the command as a non-stream access command or as a stream access command in response to the step of recording. The method also includes transmitting the first command to the disk drive.

An exemplary apparatus includes means for responding to the first file system service request in accordance with the foregoing method, and means for transmitting the first command to the disk drive.

The invention provides for responding to file system service requests for stream data or for non-stream data without a need for set mode configuration commands. For example, if the first file system service request is for non-stream data, and that the first command is a non-stream access command, the method also comprises responding to a second file system service request for stream data. The method includes recording that the second file system service request is for stream data, associating a second set of disk locations of the disk drive with the second file system service request, and preparing a second command that requires access to the second set of disk locations, the second command including control data categorizing the command as a stream access command. The method includes transmitting the second command to the disk drive.

In exemplary embodiments, the first and second file system service requests can be received and responded to in any order. For example, the second file system service request may be received before the first file system service request. Similarly, the first and second commands can be prepared and/or transmitted in any order, regardless of the order to which the first and second file system service requests are responded.

In exemplary embodiments, the step of associating can be performed in response to an application file system service request which specifies parameters that identify the file system service requests as a stream request. A feature of the invention involves using an application program interface (API) configured, for example, as an operating system extension, or "shim". The shim can be configured to intercept file system service requests identified as stream requests. Alternately, to accommodate legacy applications, the step of responding to a file system service request can include intercepting the file system service request, and determining whether the file system service request is for stream data or non-stream data. The steps of intercepting and determining can be performed by any selected API including the shim.

The shim can be configured to respond to file system service requests by updating a file allocation structure of the operating system (such as a file allocation table), and by recording whether the request is for stream data or for non-stream data. In embodiments where the shim intercepts all file system service requests, it can also record whether the request is for non-stream data. A record can be created as a single data structure accessed by a disk device driver to issue stream access commands or non-stream access commands to the disk drive. Of course, the record can be maintained in any desired location, and need not be included in the shim. The disk device driver can issue stream access commands using, for example, a stream pointer and the number of logical blocks included in the stream.

In exemplary embodiments, a conventional disk drive can be used. In alternate embodiments, the addressable locations of the disk drive can be mapped from a logical space of the file system into a physical space of the disk drive using a linked list. The mapping can be performed within the disk drive using logical block addresses obtained from the file system using contents of the record.

DETAILED DESCRIPTION OF THE PREFERRED EMBODIMENTS

Figure 1:
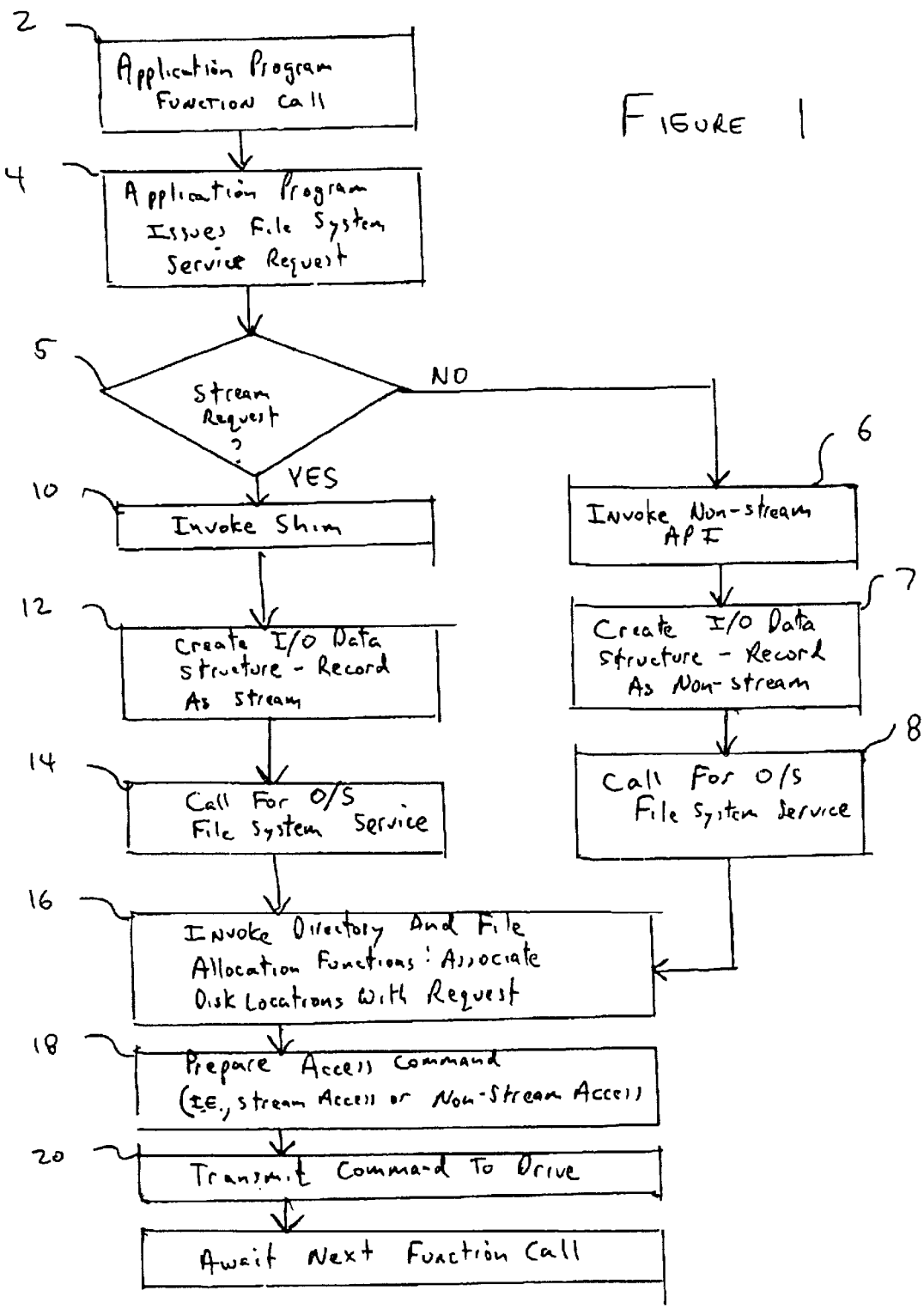
FIG. 1 is a flow chart showing an exemplary method for processing file system service requests associated with streaming and non-streaming function calls.

FIG. 1 shows an exemplary method for processing file system service requests associated with streaming and non-streaming function calls, in a computer having an attached disk drive. In response to commands from the computer, the disk drive can write data to, and read data from, disk locations to reproduce stream data and non-stream data.

In operation, a first file system service request is generated by an application program which has made a function call for a read or write action, as illustrated in step 2 of FIG. 1. In response to the function call, the application program issues the file system service request as represented by step 4. In decision block 5, a determination is made as to whether the file system service request is associated with stream data or non-stream data. This determination can be made either prior to, or within, an API configured as an operating extension, or "shim". That is, applications can be written to include function calls which result in issuance of file system service requests that specifically invoke the shim. Alternately, to accommodate legacy applications which do not include function calls with this capability, all file system service requests can be intercepted, before they invoke any API, to screen (i.e., determine) whether they are for stream data or non-stream data. This screening process can be implemented between the application programs and the API(s), or can be included within the shim or any other specified API.

Where the file system service request is associated with non-stream data, the file system service request can invoke a conventional API in step 6 to create an I/O control data structure in step 7. In accordance with an embodiment of the present invention, the I/O control data structure created by the API in step 7 can record whether the file system service request is for non-stream or stream data. This information can be recorded at any desired location. In another embodiment, information regarding requests for non-stream data need not be specifically recorded if a record of requests for stream data is maintained; that is, any requests not recorded as being stream requests can be presumed as requests involving non-stream data (or vice versa).

In step 8, the file system service request which has been determined to correspond to non-stream data calls for conventional operating system file system service. In step 16, the file system invokes directory and file allocation functions including associating a first set of disk locations of the disk drive with a first file system service request. In step 18, the file system prepares a first command that requires access to the first set of disk locations, the first command including control data categorizing the command as a non-stream access command or as a stream access command in response to the step of recording. In step 20, the disk device driver issues the first command to the drive.

The foregoing operation, with the exception of distinguishing a file system service request for non-stream data from a request for stream data, is relatively conventional. However, in accordance with exemplary embodiments of the present invention, a distinction is drawn between streaming and non-streaming requests as reflected in decision block 5.

Where a first file system service request is for non-stream data, a second file system service request which is for stream data can be processed without requiring a set mode configuration command. For example, where the second file system service request is determined as being for stream data in step 5, the file system service request invokes the API configured as a file system streaming "shim" for special handing of the request for stream data (see step 10 of FIG. 1).

In step 12, the shim creates an I/O control data structure whereby a second set of disk locations are associated on the disk drive with the second file system service request. As was discussed with respect to non-stream data, the I/O control data structure created by the shim in step 12 can record whether the file system service request is for stream data. Information regarding requests for stream data need not be specifically recorded if a record of requests for non-stream data is maintained.

Assuming that the second file system service request is recorded as being for stream data, the shim calls for operating system file system service in step 14. In step 16, the file system invokes directory and file allocation functions, which include associating a second set of disk locations of the disk drive with the second file system service request, and preparing a second command that requires access to a second set of disk locations, the second command including control data categorizing the command as a stream access command. In step 18, the file system calls the disk device driver, and in step 20, issues a device command to the drive.

The first and second requests can be received in any order (e.g., a request involving stream data can be received before or after a request involving non-stream data). The first non-stream access command and the second stream access command can be transmitted to the disk drive, in any desired order, regardless of the order in which the requests were received.

Figure 2:
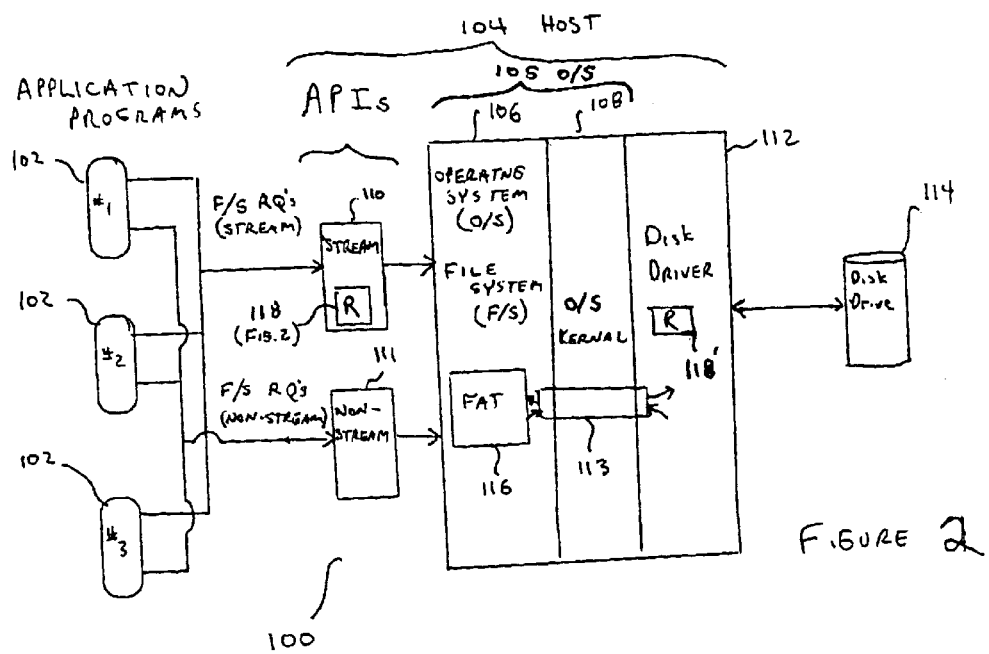
FIG. 2 is a functional block diagram showing a host computer and an attached disk drive and data structures used in the host computer in the practice of a method for processing file system service requests in accordance with the present invention.

With reference to FIG. 2, a system 100 comprises a host computer 104 and an attached disk drive 114. Host computer 104 executes one or more application programs 102 under an operating system ("OS") 105 comprising OS components 106 and 108. OS component 106 defines an OS file system and includes a file allocation structure represented as file allocation table ("FAT") 116. OS component 108 defines an OS kernel. OS 105 suitably is based upon any one of a variety of conventional operating systems such as those available from Microsoft, Inc. (such as MS DOS and WINDOWS), from Apple, Inc., or from various suppliers of UNIX and Linux.

During execution, application programs 102 execute code which can include function calls. When executing code associated with a function call, an application program will issue a file system service request to OS 105. File system service requests can involve accesses to disk drive 114 which communicates with OS 105 via a disk device driver 112. Disk drive 114 can communicate in accord with any of a variety of protocols including IDE, SCSI, and so forth, and disk device driver 112 is configured for compatibility with the selected protocol.

The file system service requests and associated accesses can involve either stream data or non-stream data. Significantly, these requests are processed and the accesses are accomplished without requiring the use of set configuration commands to change the mode of operation of disk drive 114 back and forth between a stream mode and a non-stream mode.

In one embodiment, the function calls made by the application programs result in issuance of file system service requests, specifically for stream data or for non-stream data. In alternate embodiments, legacy applications which do not produce function calls that issue special file system service requests for stream data verses non-stream data, can be accommodated. In one exemplary embodiment, all file system service requests can be intercepted and examined to determine whether they involve stream or non-stream data. Depending on this determination, an appropriate API can be used to produce a disk drive command.

The host 104 differs from prior art configurations in that it includes an apparatus for processing file system service requests to write data to or read data from disk locations to reproduce stream data and non-stream data. The apparatus includes means for responding to a first file system service request. The responding means includes an operating system extension configured, for example, as the application program interface (API) 110 referred to herein as a "shim" which is added to the file system. The responding means can be configured using any microprocessor having an associated operating system including, but not limited to, the microprocessor used to implement the host 104. The shim can be configured as a means for intercepting the first file system service request, and for determining whether the request is for stream or non-stream data. The apparatus also includes means for transmitting commands to the disk drive, represented in FIG. 1 as a modified disk device driver 112 which provides for communicating information to disk drive 114 for distinguishing between stream and non-stream commands.

The FIG. 2 host also includes a pipe, or conduit, 113 between OS component 106 and disk device driver 112 to permit information to be readily passed between OS 105 and disk device driver 112 in known fashion during I/O operations with disk drive 114. FAT 116 can be configured in accordance with any standard file system structure, and contents of a file allocation table are well known to those skilled in the art.

In addition to updating FAT 116, shim 110 can be configured to establish and maintain a separate record 118 to keep track of those logical block addresses in the file allocation table which correspond to stream data. Although the record 118 is shown in FIG. 2 as being included within the shim 110, this record alternatively can be maintained within OS component 106. In addition, rather than using a single record 118 associated with the file system which can be accessed by the disk device driver 112, an additional record 118' can be included within disk device driver 112 for recording stream identifiers associated with stream data at the disk level.

The "record", as defined herein, can be maintained in any manner which permits stream requests to be distinguished from non-stream requests. That is, the record can be maintained to identify all requests as being for either non-stream data or stream data. Alternately, the record can be maintained to specially identify file system requests involving only stream data, or a record can be maintained of requests involving only non-stream data. Thus, use of a single record to represent either requests involving stream data or requests involving non-stream data implicitly constitutes a record of requests regarding non-stream data and requests involving stream data, respectively. Those skilled in the art will appreciate that the requests themselves can be considered the record(s), where each request includes an identifier to denote that it involves stream data or non-stream data.

Shim 110 can be one of many APIs used between the application programs 102 and the host 104. In the FIG. 2 embodiment, file system service requests specifically for stream data invoke the shim 110, while file system service requests specifically for non-stream data invoke a different API. For example, when an application program makes a function call that does not involve stream data, any of a plurality of conventional application program interfaces, such as the non-stream application program interface 111 can be called.

In an alternate embodiment, legacy applications can be accommodated by intercepting all file system service requests, before any API is invoked, to determine whether the request relates to stream or non-stream data. This functionality can be implemented using a heuristic included in the shim 110, the API 111 or any other location desired. For example, the shim 110 can be configured to intercept I/O file system service requests from all application programs, to thereby alert the disk drive 114 (via the disk device driver 112) whether the pending commands to the drive involve stream data or non-stream data. The distinction can be made using any of a variety of user specified heuristics including, but not limited to, examining the file name for comparison with a directory of file name extensions that correspond to stream data (e.g., MPEG files). Any file names which can't be identified as involving stream data can be treated as involving non-stream data.

Because the record 118 in the shim 110 keeps track of those file system service requests relating to stream data, the host 104 can implicitly determine those file system service requests which do not relate to stream data. Alternately, or in addition, the non-stream application program interface 111 can be used to keep track of those file system service requests relating to non-stream data.

In accordance with the present invention, addressable locations of disk drive 114 can be allocated in response to the file system service requests of the application programs. The record 118 is updated with each file system service request.

The operating system 106 responds to the file system service request by preparing non-stream access commands or stream access commands to the disk drive. A stream access command can, for example, supply a conventional memory pointer designating the source or sink for the data, a stream number and offset for purposes of reading or writing the stream. The file allocation table, in conventional fashion, keeps track of the number of logical blocks which have been associated with a particular file system service request, and will, in the case of a write operation, deduct them from the amount of available space on the disk drive.

The translation of logical block addresses requested by the operating system 106 into physical locations on the drive itself can be performed either in the host computer or in the drive. However, in accordance with exemplary embodiments of the present invention, wherein a conventional operating system is used which has no knowledge of physical choices made by the drive, this translation can be performed in the drive in known fashion. After data has been written in physical address locations on the disk drive (for example, cylinder/head/sector locations) during a write operation, the disk drive reports back to the operating system that it has written so many blocks of a stream, and the operating system will note only the number of blocks which have been used. The operating system will retain no knowledge of where the drive has elected to place the blocks physically.

In the FIG. 2 example, information stored in the file allocation table 116 and the record 118 is used by the disk device driver 112 to issue a first type of disk drive command (for example, a stream access command) or a second type of disk drive command (for example, a non-stream access command). Because set configuration commands are not needed to place the disk drive into a mode for handling one type of data or the other, non-stream access commands can be interleaved with stream access commands. The behavior of the FIG. 2 operating system remains unchanged in all respects at both the operating system and user levels, even though it can allocate disk space differently depending on whether the request involves stream data or non-stream data.

An exemplary application program can implement the following file system service requests for executing read/write function calls:

```
my_stream_write ( "mystream.mpg", offset, length, my_address,
my_service, my_PID
);
my_stream_read ( "mystream.mpg", offset, length, my_address,
my_service, my_PID
);
```

The foregoing file system service requests specify parameters which identify the stream name ("mystream.mpg"), the offset (i.e., location of the data block of interest within the stream), the length of the stream, the associated address and service of the stream, and the process identification (PID) of the stream. These file system service requests are specifically written to invoke the shim 110, and thus implicitly include an identifier that the request involves stream data. Where the request does not involve stream data, the file system service request would invoke another API, such as the non-stream API 111 in FIG. 2.

The exemplary shim 110 is configured to create a stream input/output control (IOCTL) data structure. For example, the shim 110 can establish a stream IOCTL data structure which can be passed between the file system and the disk device driver as follows:

```
Stream_IOCTL Data Structure {
stream_device; /* Address of HDD or other storage device */
stream_cmd; /* Command: read stream or write stream */
stream_data_ptr; /* Pointer to data in user memory */
stream_handle; /* Stream reference on storage device, similar to LBA */
stream_len; /* Length of stream in bytes, frames, or seconds (high order
2 bits choose) */
stream_offset; /* Offset from start of stream in bytes, frames or
seconds */
stream_format; /* Type of stream data */
stream_QOS; /* Quality of services for stream: resolution, refresh,
bandwidth req, etc
*/
stream_timeout; /* Timeout criteria for suspension or abandonment
of stream */
};
```

In the foregoing data structure, the stream device constitutes the address of a storage device, such as a hard disk drive (HDD) where the information is to be written to or read from. The stream command is used to actually read or write the stream. The stream data pointer points where read data is to be written, or from where the write data is to be read. The stream handle is a stream identifier on the storage device in terms recognizable by the disk drive 114 (e.g., similar to logical block addresses). The data structure also includes information regarding stream length and stream offset, as well as other optional information such as stream format (e.g., mpeg), stream quality of services, and stream timeout information.

Having established a data structure for passing between the file system and the disk device driver, the shim also performs functionality relating to write and read operations. Exemplary write and read operations can, in an exemplary embodiment, be implemented as follows:

```
my_stream_write ( my_stream, offset, length, my_address,
my_service, my_PID) {
authenticate ( my_stream, my_service, my_PID);  /* Validate access
and quality of service for stream against user's Process ID */
new stream; /* Create a new stream on the device */
stream.stream_cmd = swrite;
stream.stream_device = find_streaming_device (my_stream);  /*
Identify the device */
stream.stream_handle = translate_stream_to_block
(my_stream, offset);  /*
Translate stream name into LBA or CHS */
stream.stream_data_ptr = my_address; /* Provide address of write data
in user memory space */
stream_timeout = system_default_timeout;
stream_QOS = my_service;      /* Establish Quality of Service */
sf_write_stream (stream);      /* Call the disk device driver to write
it to HDD or storage device */
ret (user_stream_number);
}
my_stream_read (mystream, offset, length, my_address,
my_service, my_PID) {
authenticate ( my_stream, my_service, my_PID);  /* Validate user
access and quality of service for stream */
stream.stream_device = find_streaming_device (my_stream);  /*
Identify the device */
stream.stream_handle = translate_stream_to_block
(my_stream, offset);   /* Translate stream name into LBA or CHS */
stream.stream_data_ptr = my_address; */ Provide address of write data
in user memory space */
stream_timeout = system_default_timeout;
stream_QOS = my_service;      /* Establish Quality of Service */
sf_read_stream (stream);      /* Call the disk device driver to write
it to HDD or storage device */
ret (user_stream_number);
}
```

In the foregoing examples, the write and read operations perform an authentication step to validate the access quality of the service for the stream against the user's process ID. Of significance with respect to the write operation is the translation of the stream into block information recognizable by the disk, such as logical block addresses (LBA) or cylinder/head/sector (CHS) address. In response to writing the stream on the disk media, a user stream number is returned at the end of the write operation.

In a read operation, a stream name is translated into an address recognizable by the disk drive (LBA or CHS). Information read from the disk is supplied to a designated storage device, and upon completion of the read operation, a stream number is returned.

As mentioned, a conventional operating system is modified in accordance with exemplary embodiments of the present invention to include the shim 110, and to include a modified disk device driver 112. Exemplary functions performed at the modified disk device driver with regard to a write and read operation are as follows:

```
sf_write_stream ( stream Stream_IOCTL) {
select_drive ( stream.stream_device);
out_drive ( stream.stream_handle);   /* contains LBA for legacy */
out_drive ( stream.stream_offset);
out_drive ( stream.stream_len);
out_drive ( stream.stream_QOS);     /* Lock and load the params */
out_drive ( stream.stream_io_cmd); /* Issue the command to
the device*/
set_watchdog_timer ( stream.stream_timeout );  /* start the watchdog
timer */
ret (stream.stream_len); /* returns count of bytes, frames, or seconds
written */
}
```

```
sf_read_stream ( stream Stream_IOCTL ) {
select_drive ( stream.stream_device );
out_drive ( stream.stream_handle ); /* contains LBA for legacy */
out_drive ( stream.stream_offset );
out_drive ( stream.stream_len );
out_drive ( stream.stream_QOS );      /* Lock and load the params */
out_drive ( stream.stream_io_cmd);  /* Fire the command at the
device*/
set_watchdog_timer ( stream.stream_timeout );  /* start the watchdog
timer */
ret (stream.stream_len); /* returns count of bytes, frames or seconds
read */
}
```

In accordance with exemplary embodiments, the addressable locations of the disk drive are mapped from the logical space used by the file system into the physical space of the disk drive using any known mapping. In accordance with alternate exemplary embodiments of the present invention, a linked list can be used that optimizes the efficiency with which streaming information is stored. Such a linked list is described in the aforementioned co-pending U.S. application Ser. No. 09/397,152, entitled: "Disk-Based Storage System Responsive To A Direction-Selection Signal For Autonomously Controlling Seeks In A Sequence Determined By The Direction-Selection Signal, And A Locally-Stored Doubly-Linked List" (Attorney Docket No. K35A0542), the contents of which are incorporated herein by reference. By using a linked list, a more streamlined data structure and data transfer can be used, such as:

```
max_streams #DEF 16384
stream_dir Data Structure {
stream_name;               /* ASCII name of the stream */
stream_owner;              /* Owner of the stream */
stream_access;             /* Access modifiers of the stream */
};
static entries_in_stream;
stream_dir sdir[max_streams]; /* Creates the directory of
streams - offset is stream
handle */
```

In this modified data structure, the stream name is identified with reference to an ASCII name, the stream owner, and access modifiers. In addition, a stream directory can be created, whereby streams can be more easily identified. In such an embodiment, write and read operations associated with the shim 110 can be implemented as follows:

```
my_stream_write ( my_stream, offset, length, my_address,
my_service, my_PID ){
authenticate ( my_stream, my_service, my_PID );    /* Validate
access and quality of service for stream against user's Process ID */
new stream;   /* Create a new stream on the device */
stream.stream_cmd = swrite;
stream.stream_device = find_streaming_device (my_stream); /* Identify
the device */
stream.stream_data_ptr = my_address; /* Provide address of write data
in user memory space */
stream_timeout = system_default_timeout;
stream_QOS = my_service;     /* Establish Quality of Service */
stream.stream_handle = sf_write_stream (stream);         /* Call the
disk device driver to write it to HDD or storage device and have device
return the stream handle */
create_sdir_entry (my_stream, stream.stream_handle);  /* Create an
association between stream name and handle in the directory of streams*/
```

-continued

```
ret (stream.stream_handle);          /* Return handle
of the newly created stream
}
my_stream_read ( my_stream, offset, length, my_address,
my_service, my_PID ) {
authenticate ( my_stream, my_service, my_PID );       /* Validate
user access and quality of service for stream */
stream.stream_device = find_streaming_device (my_stream); /* Identify
the device */
stream.stream_handle = find_stream ( stream.stream_device,
my_stream); /* Identify the stream within the device
by looking up the stream name in the stream directory */
stream.stream_data_ptr = my_address; /* Provide address of write
data in user memory space */
stream_timeout = system_default_timeout;
stream_QOS = my_service;        /* Establish Quality
of Service */
sf_read_stream (stream);          /* Call the disk device
driver to write it to HDD or storage device */
ret (stream.stream_handle); /* Return stream handle to indicate
all data read */
}
```

The shim also creates and maintains a directory of streams stored on the disk, such that a particular stream can be easily located using a "find stream" command that references a stream handle assigned to each stream by the drive:

```
create_sdir_entry ( my_stream, stream.stream_handle ) {
    if (entries_in_sdir => max_streams) shandle = -1;
    else {
    sdir[entries_in_sdir] = my_stream;
    shandle = ++entries_in_sdir;
    }
    ret (shandle);
}
find_stream ( my_stream, stream.stream_handle) {
    for (i:=0; i++, entries_in_sdir)
    if (my_stream = sdir[i].stream_name) exit;
    if (i < entries_in_sdir) shandle = i;    /* Stream found */
    else shandle = -1;    /* Stream not found */
    ret (shandle);
    }
```

Write and read operations at the shim level for an alternate embodiment are similar to those described with respect to the first embodiment, except that rather than returning a stream number upon completion of the write or read operation, a stream handle is returned. In the case of a write operation, the handle of the newly created stream is returned, and in the case of a read operation, the stream handle is returned to indicate all data has been read.

At the disk device driver level, write and read operations are simplified in this alternate embodiment as follows:

```
sf_write_stream ( stream Stream_IOCTL ) {
export( stream_device, Stream_IOCTL);        /* Send the IOCTL
to the device */
set_watchdog_timer ( stream.stream_timeout );      /* start the
watchdog timer */
import( stream_device, Stream_IOCTL);        /* Obtain
completion status from the device */
ret (stream.stream_handle); /* returns stream handle upon success */
}
sf_read_stream ( stream Stream_IOCTL ) {
export( stream_device, Stream_IOCTL);        /* Send the
IOCTL to the device */
set_watchdog_timer ( stream.stream_timeout );      /* start the
watchdog timer */
import( stream_device, Stream_IOCTL);        /* Obtain status
with new stream handle from the device */
ret (stream.stream_handle); /* returns stream handle upon success */
}
```

In the foregoing disk device driver functions, write and read operations are performed by exporting/importing the stream IOCTL, as opposed to separately communicating each parameter of the IOCTL.

As already mentioned, a heuristic can be included in the shim 100 (or any other element of the FIG. 1 system) to distinguish requests for stream data versus requests for non-stream data. An exemplary heuristic examines file extensions for comparison against a list of known extensions involving stream data, examines access length against a user specified access length associated with typical streams, and examines file format for user-specified structures that reveal streams, as follows:

```
shim ( myfile, offset, len, my_address, my_service, my_PID ) {
check_file_type ( myfile );     /* Test file extensions against known
streaming file types */
check_file_len ( myfile, len );   /* Test access length against
stream access */
check_file_format (myfile );      /* Examine file format for
structures that reveal streams*/
If (any of the above checks) then
    If ( read ) my_stream_read ( myfile, offset, len, my_address,
    my_service, my_PID );
    /* Call streaming read */
    Else if ( write ) my_stream_write ( myfile, offset, len, my_address,
    my_service, my_PID );   /* Call streaming write */
Else (not a stream)
If( read )sys$_read( myfile, offset, len, my_address,
    my_service, my_PID );   /* Call standard system read */
    Else if ( write ) sys$_write( myfile, offset, len, my_address,
    my_service, my_PID );
        /* Call standard system write */
ret;
}
```

Figure 3:
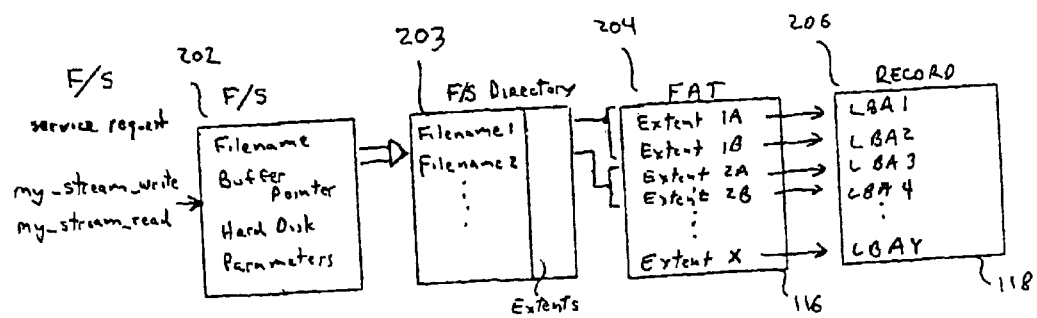
FIG. 3 is a functional block diagram showing an example of the contents of a file system service request, an exemplary file system allocation structure and an exemplary record maintained in accordance with the present invention.

FIG. 3 shows an exemplary file system service request 202 such as the my_stream_write or my_stream_read requests already mentioned. These requests include IOCTL information such as a file name, a buffer pointer, a hard disk address, and other parameters regarding the file such as offset, seek command, and so forth. These file system service requests are supplied by the shim to a file system directory 203, which correlates the file name to a plurality of extents stored in the FAT. Each extent is assigned to a logical space in the disk drive via a logical block address (LBA). The file allocation table 204 maintains a status of the number of logical block addresses of the disk drive which have been used, and therefore retains knowledge of the available memory space on the drive.

When the file system service requests includes a stream data identifier, the record 118 of FIG. 2 can be updated. FIG. 3 shows an exemplary record 206, wherein each logical block address associated with streaming data is identified as such. When the disk device driver writes to or reads from the disk drive 114, the logical block address obtained from the file allocation table can be used in conjunction with the record 206 to indicate to the disk drive 114 that stream data is involved. As such, both stream and non-stream data can be written to or read from memory without requiring physical mode changes using set configuration commands.

We claim:

1. A method for processing file system service requests in a computer having an attached disk drive with stream and non-stream modes of operation that in response to commands from the computer can write data to or read data from disk locations to reproduce stream data and non-stream data, the method comprising the steps of:

responding to a first file system service request by:
recording whether the first file system service request is for non-stream or stream data,
associating a first set of disk locations of the disk drive with the file system service request, and
preparing a first command that requires access to the first set of disk locations for causing the disk drive to operate in a stream or non-stream mode in accordance with the first file system service request, the first command including control data categorizing the command as a non-stream access command or as a stream access command in response to the step of recording; and
transmitting the first command to the disk drive.

2. Method according to claim 1, wherein the first command is a non-stream access command, the method comprising the step of:

responding to a second file system service request for stream data by:
recording that the second file system service request is for stream data,
associating a second set of disk locations of the disk drive with the
second file system service request, and
preparing a second command that requires access to the second set of
disk locations, the second command including control data categorizing the command as a stream access command;
transmitting the second command to the disk drive.

3. Method according to claim 2, wherein the first and second file system service requests can be received in any order.

4. Method according to claim 2, wherein the first and second commands can be transmitted to the disk drive in any order, regardless of the order in which the first and second file system service requests are received.

5. Method according to claim 2, wherein the second file system service request specifies parameters that identify a stream request.

6. Method according to claim 5, wherein the step of responding to the second file system service request includes a step of:
intercepting the second file system service request with a shim configured as an application program interface for processing stream data.

7. A method according to claim 1, wherein the step of responding to the first file system service request includes the step of:
intercepting the first file system service request; and
determining whether the first file system service request is for stream data or non-stream data.

8. Method according to claim 7, wherein the step of determining includes the step of:
using a heuristic which examines at least one of a file extension, an access length, and a file format included with the first file system service request.

9. Method according to claim 1, wherein the step of associating the first set of disk locations with the first file system service request includes steps of:

updating a file allocation structure; and
maintaining a record for requests involving stream data.

10. Method according to claim 9, wherein a single data structure is used to distinguish requests involving stream data from requests involving non-stream data.

11. Method according to claim 9, wherein the step of preparing the first command includes a step of accessing the record.

12. Method according to claim 1, comprising a step of mapping addressable locations of the disk drive from a logical space into a physical space using a linked list.

13. Method according to claim 12, wherein the step of mapping includes a step of using logical block addresses obtained from a file allocation structure of a file system, and contents of a record which identifies whether a file system service request is for stream data or non-stream data.

14. Apparatus for processing file system service requests in a computer having an attached disk drive with stream and non-stream modes of_operation that in response to commands from the computer can write data to or read data from disk locations to reproduce stream data and non-stream data, comprising:

means for responding to a first file system service request by,
recording whether the first file system service request is for non-stream or stream data,
associating a first set of disk locations of the disk drive with the file system service request, and
preparing a first command that requires access to the first set of disk locations for causing the disk drive to operate in a stream or non-stream mode in accordance with the first file system service request, the first command including control data categorizing the command as a non-stream access command or as a stream access command in response to the recording; and
means for transmitting the first command to the disk drive.

15. Apparatus according to claim 14, comprising:
means for intercepting the first file system service request with a shim configured as an application program interface for processing stream data.

16. A method for processing file system service requests in a computer having an ached disk drive that in response to commands from the computer can write da to or read data from disk locations to reproduce sty data and non-stream data, the method comprising the steps of:

responding to a first file system service request by:
determining whether the first file system service request is for stream data or non-stream data,
recording whether the first file system service request is for non-stream or stream data,
associating a first set of disk locations of the disk drive with the file system service request, and preparing a first command that requires access to the first set of disk location, the first command including control data categorizing the command as a non-stream access command or as a stream access command in response to the step of recording; and
transmitting the first command to the disk drive.

17. Method according to claim 16 wherein the step of responding to the first file system service request includes the step of:
intercepting the first file system service request to perform the step of determining.

* * * * *